United States Patent
Shaaban et al.

[11] Patent Number: 5,879,522
[45] Date of Patent: Mar. 9, 1999

[54] ELECTROLYSIS CELL

[75] Inventors: Aly H. Shaaban, Panama City, Fla.; Eric K. Dobyne, West Bloomfield, Mich.

[73] Assignee: The United States of America as represented by the Secretary of the Air Force, Washington, D.C.

[21] Appl. No.: 919,075

[22] Filed: Aug. 22, 1997

[51] Int. Cl.[6] .............................. C25B 9/00; C25B 11/03; C25B 11/04; C25B 11/10

[52] U.S. Cl. ..................... 204/263; 204/283; 204/284; 204/290 F; 204/290 R; 204/291; 204/292; 204/294

[58] Field of Search ..................... 204/263–266, 204/282–283, 290 R, 290 F, 291, 294, 222, 260, 252–258, 296; 205/630

[56] References Cited

U.S. PATENT DOCUMENTS

| | | | |
|---|---|---|---|
| 4,177,116 | 12/1979 | De Nora et al. ..................... | 204/263 X |
| 4,292,160 | 9/1981 | Marcantonio ........................ | 204/260 X |
| 4,626,331 | 12/1986 | Goto et al. ............................ | 204/260 X |
| 4,981,563 | 1/1991 | Spaziante et al. ................... | 204/263 X |

OTHER PUBLICATIONS

Shaaban, A.H., *Pulsed DC And Anode Depolarization In Water Electrolysis For Hydrogen Generation*, Air Force Civil Engineering Support Agency, Tyndall Air Force Base Florida, Aug. 1994.

*Primary Examiner*—Donald R. Valentine
*Attorney, Agent, or Firm*—Bobby D. Scearce; Thomas L. Kundert

[57] ABSTRACT

An electrolysis cell for the efficient production of hydrogen and oxygen is described which comprises a substantially closed housing defining therewithin anode and cathode chambers and having first and second inlets and outlets for flowing electrolyte through the anode and cathode chambers; an ion exchange membrane within the housing separating the anode chamber from the cathode chamber; first and second electrically conductive sheet members disposed within the respective anode and cathode chambers adjacent the membrane and substantially coextensive therewith; discrete electrically conducting ultramicroelectrode particles, preferably in the 5 to 10 micron size range, disposed within the anode and cathode chambers and defining the anode and cathode of the cell; and a source of DC electrical current operatively connected to the first and second sheet members.

8 Claims, 1 Drawing Sheet

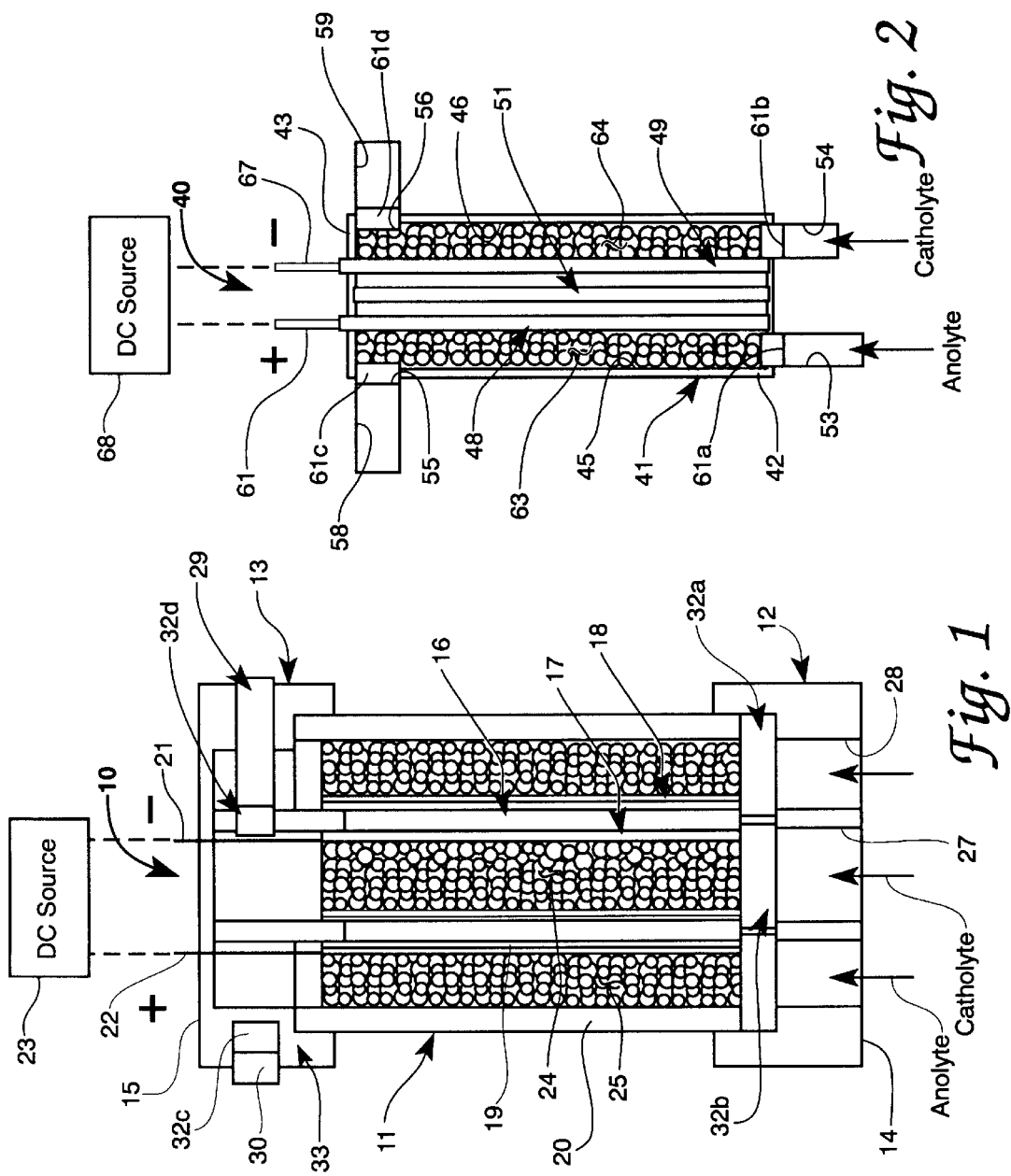

_ELECTROLYSIS CELL_

RIGHTS OF THE GOVERNMENT

The invention described herein may be manufactured and used by or for the Government of the United States for all governmental purposes without the payment of any royalty.

BACKGROUND OF THE INVENTION

The present invention relates generally to electrolysis cells, and more particularly to a water electrolysis cell for efficient production of hydrogen and oxygen using ultramicroelectrodes.

In water electrolysis, a potential is applied between an anode and a cathode immersed in an electrolyte to generate hydrogen at the cathode. Rate of hydrogen generation is dependent on the applied current and is independent of voltage above the minimum potential for electrolysis to proceed. The limitation on the current is directly related to electrolyte conductivity and electrode surface area. Conventional electrolysis cells include substantially two-dimensional plate electrodes. Electrolyte-electrode interface area is maximized by roughening, perforating or corrugating the electrode surface in order to increase current density and lower cell voltage, but current density has been substantially limited to about 1000 $A/m^2$. Porous electrodes having high pore surface area approximate three-dimensional operation and may provide current densities up to 10,000 $A/m^2$, but pore size, length and density are not uniform. The pores are tortious and closed at the ends which causes gas generated inside the pores to be confined by capillary action until the gas pressure exceeds the capillary forces. A central core of gas established inside the pore with a thin layer of electrolyte adhering to the pore walls results in an ohmic drop through the electrolyte film, which opposes the beneficial effect of increasing electrode surface area.

The invention solves or substantially reduces in critical importance problems with existing electrolysis cells as just suggested by providing a monopolar electrolysis cell structure in which a membrane separates the catholyte and anolyte chambers and allows only ion exchange between the chambers in order to separate the generated hydrogen and oxygen, and uses ultramicroelectrode particles with diameters in the micron size range as electrodes in order to maximize electrode surface area. The invention can be operated as a fluidized bed reactor by using electrolyte flow or by recycling a portion of the generated hydrogen or oxygen to keep the particles in suspension. The invention may be statically-fed to avoid electrolyte pumping and circulating. Use of ultramicroelectrodes according to the invention provides a large surface area to the flow of electrolyte, small diffusion layer, low ohmic losses, high current densities, and rapid time response with high rate of mass transfer and the associated high operating efficiencies, as compared to conventional cells containing planar electrodes.

Background material related to electrolysis generally which may be helpful in understanding the invention may be found by reference to *Pulsed DC And Anode Depolarization In Water Electrolysis For Hydrogen Generation*, by A. H. Shaaban, ESL-TR-92-55, Air Force Civil Engineering Support Agency, Tyndall Air Force Base FL (August 1994), and the references cited therein, the entire teachings of which are incorporated by reference herein.

It is therefore a principal object of the invention to provide an improved electrolysis cell.

It is another object of the invention to provide an electrolysis cell having high current density and operating efficiency.

It is another object of the invention to provide an electrolysis cell containing porous electrodes comprising ultramicroelectrode particles.

It is a further object of the invention to provide an electrolysis cell providing high current density and high reaction rate for the generation of hydrogen.

It is another object of the invention to provide an electrolysis cell for producing hydrogen and oxygen at about 99.99% purity.

These and other objects of the invention will become apparent as a detailed description of representative embodiments proceeds.

SUMMARY OF THE INVENTION

In accordance with the foregoing principles and objects of the invention, an electrolysis cell for the efficient production of hydrogen and oxygen is described which comprises a substantially closed housing defining therewithin anode and cathode chambers and having first and second inlets and outlets for flowing electrolyte through the anode and cathode chambers; an ion exchange membrane within the housing separating the anode chamber from the cathode chamber; first and second electrically conductive sheet members disposed within the respective anode and cathode chambers adjacent the membrane and substantially coextensive therewith; discrete electrically conducting ultramicroelectrode particles, preferably in the 5 to 10 micron size range, disposed within the anode and cathode chambers and defining the anode and cathode of the cell; and a source of DC electrical current operatively connected to the first and second sheet members.

DESCRIPTION OF THE DRAWINGS

The invention will be more clearly understood from the following detailed description of representative embodiments thereof read in conjunction with the accompanying drawings wherein:

FIG. 1 shows a schematic diagram in axial section of a cylindrically configured monopolar ultramicroelectrode electrolysis cell structured in accordance with the invention; and FIG. 2 shows a schematic diagram in section of a monopolar ultramicroelectrode electrolysis cell in a slab configuration structured in accordance with the invention.

DETAILED DESCRIPTION

Referring now to the drawings, FIG. 1 is a diagram in axial section of a monopolar ultramicroelectrode electrolysis hydrogen generator cell 10 in cylindrical configuration according to the invention, and FIG. 2 is a sectional view of a monopolar ultramicroelectrode electrolytic cell 40 in slab configuration according to the invention. In FIG. 1, cell 10 includes substantially cylindrically shaped housing 11 having at respective first and second ends 12,13 end caps 14,15 and having an inner cylindrically shaped membrane 16 disposed between two concentric substantially cylindrical electrode feeders 17,18 defining substantially concentric cylindrical inner chamber 19 and outer annularly shaped chamber 20. Housing 11 and end caps 14,15 are constructed of material such as TEFLON-coated plastic, wood, aluminum, steel or other suitable non-electrically-conducting material as would occur to the skilled artisan practicing the invention. Membrane 16 separates oxygen generated at the anode from hydrogen generated at the cathode and prevents short-circuiting of the electrodes. The membrane must be compatible with the electrolyte used in the cell and, accordingly, comprises a cylindrical layer or film of asbestos, suitably coated organic polymers, thermoplastic polymers, or other material known in the art as appropriate for the stated purpose. One commercially available product that can be used is NAFION-324 manufactured by DuPont.

Electrode feeders 17,18 (cathode 17, anode 18, in the FIG. 1 embodiment) preferably have roughly the same surface area, and are disposed respectively internally and externally of and substantially concentrically and coextensively with membrane 16 as suggested in FIG. 1. Electrode feeders 17,18 are sheet-like members constructed of thin electrically conducting materials such as braided metal wires, metal cloth, foam metal or thin metal sheet. The metal used must be compatible with those used in the cathode and anode particles in chambers 19,20 and preferably be of the same material. Cathode terminal 21 and anode terminal 22 are connected respectively to cathode 17 and anode 18 and extend through endcap 15 for connection to an external DC source 23 of power. Chamber 19 comprises one electrode (cathode) region of cell 10, and chamber 20 comprises the other electrode (anode) region. The anode and cathode regions (chambers 19,20) are fluidized or packed beds containing discrete micrometer sized (preferably about 5 to 10 $\mu$m) electrically conducting ultramicroelectrode particles 24,25 of titanium, nickel, stainless steel, carbon, metal oxides or metallized glass, including precious metal (e.g., gold, titanium, nickel or platinum) plated glass for maximizing electrode surface area in each of chambers 19,20. Cathode and anode particle materials are selected to minimize cathode and anode overpotentials. Inlets 27,28 in end cap 14 and outlets 29,30 in end cap 15 provide means for flowing anolyte and catholyte from sources thereof (not shown) through chambers 19,20. Electrolytes appropriate for use in various embodiments of the invention include diluted solutions of sulfuric acid, caustic potash or caustic soda, or others known in the electrolysis art. Particle 24,25 density is preferably less than the electrolyte density. The ultramicroelectrode particles are in electrical contact with feeder electrodes 17,18, each particle in the catholyte acting as a cathode and each particle in the anolyte as an anode. Electrodes 17,18 are configured to allow ion transfer but to prevent flow of particles into the region containing membrane 16 between electrodes 17,18. Current densities up to 30,000 A/m$^2$ are achievable.

For operation of the invention in a mode wherein chambers 19,20 are fluidized beds, flow of electrolyte is controlled to keep particles 24,25 in suspension. For operation wherein chambers 19,20 are packed beds, static (or batch) electrolytye feed is used, and a portion of the generated hydrogen may be circulated through chamber 19 (catholyte chamber) to maintain cathode particles 24 in suspension and a portion of the generated oxygen (or an anode depolarizer in a system where anode depolarization is employed) may be circulated through anolyte chamber 20 to maintain anode particles 25 in suspension.

The packed bed will function as a perfect porous electrode by increasing the electrolyte-electrode interface area up to about 200 times using 10 $\mu$m particles and thereby maximizing the hydrogen yield of the cell. Using particle electrodes in suspension wherein no interaction occurs between the diffusion layers increases the electrolyte-electrode interface area to more than 200 times. The fluidized bed is an excellent ion scavenger because of the large surface area for flow of electrolyte if a substantially uniform potential distribution is applied such as by using a thin (about 5 mm thick) bed electrode where material flow and current vectors are oriented at right angle.

In each inlet 27,28 and outlet 29,30 porous plugs 32$a,b,c,d$ of appropriate size and shape are disposed in order to contain particles 24,25 within chambers 19,20 in the event of electrolyte flow surge. Plugs 32$a,b,c,d$ may preferably comprise metal cloth or foam metal. The material used shall be compatible with or similar to the corresponding electrode feeder material. Endcap 15 at second end 13 of housing 11 may be configured to define manifold assembly 33 for collection of generated hydrogen and oxygen separately into storage containers (not shown).

In the monopolar slab configuration for the invention shown in FIG. 2, cell 40 includes a rectangular housing 41 having first and second ends 42,43 and comprises suitable non-electrically-conducting material as suggested above for housing 11 of cell 10. Container 41 defines a pair of interior anode and cathode chambers 45,46 separated by planar electrode feeders 48,49 and ion exchange membrane 51. Inlets 53,54 and outlets 55,56 are defined in respective first and second ends 42,43 of housing 41 to accommodate anolyte and catholyte flow through chambers 45,46 and to provide outlets 58,59 for drawing oxygen and hydrogen from cell 40. Porous plugs 61$a,b,c,d$ disposed at inlets 53,54 and outlets 55,56 serve the same function as plugs 32 of cell 10 of FIG. 1. Ultramicroelectrode particles 63,64 are disposed within chambers 45,46 as suggested in FIG. 2 to define the porous electrodes of cell 40. Anode and cathode terminals 66,67 are attached to electrode feeders 48,49 and extend through housing 41 at end 43 as illustrated for connection to a DC source 68. Materials comprising each element of cell 40 may be the same as correspondingly named elements of FIG. 1. It is noted that more than one cell (i.e. anode and cathode chambers and membrane combinations) may be included in a single housing to define a multicell structure.

It is noted that size of cell 10 or of cell 40 is not considered limiting of the invention described herein. However with reference again specifically to FIG. 2, and for the purpose of demonstrating the size and capacity of a representative cell in demonstration of the invention, a monopolar electrolytic cell in the slab configuration denoted by 40 may be built with anode and cathode chambers 45,46 1.5 cm wide by 7.5 cm high and 16 cm deep filled to a height of 5 cm with 10 $\mu$m particles, the cathode chamber 46 containing stainless steel particles adjacent a cathode feeder 49 of stainless steel cloth and the anode chamber 45 containing titanium particles adjacent an anode feeder 48 of titanium coated nickel cloth. This configuration can produce an electrode surface area in excess of 500 times that of the effective area of a planar electrode with 7.5 cm by 16 cm dimensions. Using 10% sulfuric acid electrolyte pumped with enough velocity to keep the elctrode particles in suspension, the cell can accept current density in the range of 21,000 A/m$^2$ at a cell potential of 2.5 volts.

The invention therefore provides a water electrolysis cell for efficient production of oxygen and hydrogen using ultramicroelectrodes. It is understood that modifications to the invention may be made as might occur to one skilled in the field of the invention, within the scope of the appended claims. All embodiments contemplated hereunder which achieve the objects of the invention have therefore not been shown in complete detail. Other embodiments may be developed without departing from the spirit of the invention or from the scope of the appended claims.

What is claimed is:

1. An electrolysis cell for the efficient production of hydrogen and oxygen, comprising:

(a) a substantially closed housing defining therewithin a first anode chamber and a second cathode chamber, said housing including a first inlet and outlet for flowing anolyte through said first chamber and a second inlet and outlet for flowing catholyte through said second chamber;

(b) an ion exchange membrane within said housing and separating said first chamber from said second chamber;

(c) a first electrically conductive sheet member disposed within said first chamber adjacent said membrane and substantially coextensive therewith, and a second electrically conductive sheet member disposed within said second chamber adjacent said membrane and substantially coextensive therewith;

(d) a first quantity of discrete electrically conducting ultramicroelectrode particles disposed within said first chamber in contact with said first sheet member, and a second quantity of discrete electrically conducting ultramicroelectrode particles disposed within said second chamber in contact with said second sheet member; and (e) a source of DC electrical current operatively connected to said first and second sheet members.

2. The cell of claim 1 wherein said housing comprises a non-electrically conducting material.

3. The cell of claim 1 wherein said membrane is a material selected from the group consisting of asbestos, organic polymers and thermoplastic polymers.

4. The cell of claim 1 wherein said first and second electrically conducting sheet members comprise a material selected from the group consisting of braided metal wires, metal cloth, foam metal and thin metal sheet.

5. The cell of claim 1 wherein said first quantity of particles and said second quantity of particles are in the size range of about 5 to 10 micrometers.

6. The cell of claim 1 wherein said first quantity of particles and said second quantity of particles comprise a material selected from the group consisting of titanium, nickel, stainless steel, carbon, metal oxides, and metallized glass including gold, titanium, nickel or platinum plated glass.

7. The cell of claim 1 further comprising a source of anolyte and catholyte for flowing through said anode chamber and said cathode chamber.

8. The cell of claim 7 wherein said source of anolyte and catholyte is adapted to contain a material selected from the group consisting of dilute solutions of sulfuric acid, caustic potash and caustic soda.

* * * * *